United States Patent
Skjold et al.

(10) Patent No.: US 10,697,292 B2
(45) Date of Patent: Jun. 30, 2020

(54) APPARATUS AND METHOD FOR TRANSFERRING INFORMATION ACOUSTICALLY FROM A BOREHOLE

(71) Applicant: Industrial Controls AS, Sandnes (NO)

(72) Inventors: Jan Erik Skjold, Stavanger (NO); Kåre Olav Krogenes, Haugesund (NO)

(73) Assignee: Industrial Controls AS, Sandnes (NO)

( * ) Notice: Subject to any disclaimer, the term of this patent is extended or adjusted under 35 U.S.C. 154(b) by 1 day.

(21) Appl. No.: 16/074,928

(22) PCT Filed: Feb. 1, 2017

(86) PCT No.: PCT/NO2017/050029
§ 371 (c)(1),
(2) Date: Aug. 2, 2018

(87) PCT Pub. No.: WO2017/135828
PCT Pub. Date: Aug. 10, 2017

(65) Prior Publication Data
US 2019/0032485 A1    Jan. 31, 2019

(30) Foreign Application Priority Data
Feb. 3, 2016 (NO) .................................. 20160180

(51) Int. Cl.
*E21B 47/16* (2006.01)
*E21B 47/10* (2012.01)
(Continued)

(52) U.S. Cl.
CPC .......... *E21B 47/16* (2013.01); *E21B 47/1025* (2013.01); *E21B 49/008* (2013.01); *G01V 1/22* (2013.01); *G08C 23/02* (2013.01)

(58) Field of Classification Search
CPC ......... E21B 47/16; E21B 49/008; G01V 1/22; G08C 23/02
See application file for complete search history.

(56) References Cited

U.S. PATENT DOCUMENTS 6,912,177 B2    6/2005  Smith
7,301,472 B2   11/2007  Kyle et al.
(Continued)

FOREIGN PATENT DOCUMENTS

EP        2463478       6/2012
WO    2002/086288      10/2002
WO    2015/047259       4/2015

OTHER PUBLICATIONS

Norwegian Search Report, Norwegian Patent Application No. 2016180, dated Aug. 2, 2012.
(Continued)

*Primary Examiner* — Amine Benlagsir
(74) *Attorney, Agent, or Firm* — Andrus Intellectual Property Law, LLP (57) ABSTRACT

An apparatus is for transferring information acoustically via a tubular. The apparatus has a signal generator, an energy source, and means for intrusion into a tubular wall at a desired location. The signal generator is arranged to generate signals with a P-wave direction substantially approximating the axial direction of said tubular at said desired location. The means for intrusion into a tubular wall are adapted for transferring acoustic signals from the apparatus into the tubular. The apparatus further has a mechanical plug comprising fastening means for anchoring into a tubular wall. The plugs fastening means constitutes the apparatus' means for intrusion into a tubular wall. A method for transferring information acoustically via a tubular is disclosed.

11 Claims, 4 Drawing Sheets

(51) Int. Cl.
 E21B 49/00 (2006.01)
 G01V 1/22 (2006.01)
 G08C 23/02 (2006.01)

(56) References Cited

U.S. PATENT DOCUMENTS

| | | |
|---|---|---|
| 2004/0246141 A1 | 12/2004 | Tubel et al. |
| 2005/0121253 A1 | 6/2005 | Stewart et al. |
| 2011/0288842 A1* | 11/2011 | Gutierrez Ruiz ....... E21B 43/00 703/10 |
| 2015/0159480 A1 | 6/2015 | Kalyanaraman et al. |
| 2016/0194930 A1* | 7/2016 | Durst ................. E21B 41/0035 166/386 |
| 2016/0290847 A1* | 10/2016 | Gronsberg ............ E21B 47/101 |
| 2016/0341011 A1* | 11/2016 | Steele ................ E21B 41/0042 |
| 2017/0096891 A1* | 4/2017 | Gao ........................ E21B 33/16 |

OTHER PUBLICATIONS

International Search Report, PCT/NO2017/050029, dated Jul. 7, 2017.
Written Opinion, PCT/NO2017/050029, dated Jul. 7, 2017.

\* cited by examiner

APPARATUS AND METHOD FOR TRANSFERRING INFORMATION ACOUSTICALLY FROM A BOREHOLE

FIELD

The invention relates to an apparatus and method for transferring information acoustically. More specifically the invention relates to an apparatus and method for transferring information from a borehole acoustically via a tubular.

BACKGROUND

Gathering information about well conditions is something that is of vital importance in the oil and gas industry, and well known. However, gathering and transferring information from below barriers in a borehole, such as below plugs or valves, can be challenging.

Solutions to the problem exist. U.S. Pat. No. 7,301,472B2 proposes to transfer signals past obstructions in a borehole acoustically by use of a tubing string.

U.S. Pat. No. 6,912,177B2 describes transmitting data in a borehole past an obstruction by sending sonic signals along an elongated tubular member, by sending it from a first side of a physical obstruction to a second side of the obstruction, where the second side is located a short distance from the first side. The signal will be received by a receiver on the second side of the obstruction, where it will be stored for later retrieval.

Both the referenced patents relate to transmission of signals along an elongate tubular member, such as a drill string, with particular adaptions made to the tubular member prior to lowering into a borehole. Neither of the referenced patents provide a solution for transferring signals past a barrier set in a tubular permanently fixed to the surroundings where such adaptions may not be possible.

An acoustic signal may propagate either as a body wave or as a surface wave in an elastic medium with rigidity, such as iron or steel. Surface waves contain little energy and are quickly absorbed by the body's surroundings and are therefore of little use to propagate a signal over a useful distance. Surface waves are often used in ultrasonic inspection equipment.

Body waves are of two types: Primary waves (also called P-waves or pressure waves) and Secondary waves (S-waves or shear waves).

In a body wave, the acoustic energy is transferred as a longitudinal wave (P-wave) or as a transverse wave (S-wave) through an elastic medium with rigidity. P-waves may also propagate in liquid or gaseous materials, where S-waves only propagate in solid materials, as shear forces.

A P-wave is a body wave that moves particles within the body back and forth in the same direction and in the opposite direction as the direction the wave is forming and is formed by alternating compressions and rarefactions. An S-wave is a body wave that shakes the body back and forth perpendicular to the direction the wave is moving. The S-wave's energy thus quickly dissipates to the surroundings.

US2005/0121253A1 discloses a telemetry system having: a pipe; a SCADA box acoustically coupled to the pipe; and a gauge inserted in the pipe. The gauge comprises: an acoustic wave generator; a coupler mechanically connected to the acoustic wave generator. The coupler is engageable and disengageable with the pipe, and the coupler defines an acoustic transmission path between the acoustic wave generator and the pipe when engaged with the pipe. The gauge further comprises a signal controller in communication with the acoustic wave generator. Further is disclosed a method for communicating information in a wellbore from a downhole location to the surface, the method having the following steps: running a downhole gauge into a pipe within the wellbore, wherein the downhole gauge comprise an acoustic wave generator; setting the downhole gauge in the pipe; and communicating an acoustic signal between the downhole gauge and the pipe.

SUMMARY

The invention has for its object to remedy or to reduce at least one of the drawbacks of the prior art, or at least provide a useful alternative to prior art.

The object is achieved through features, which are specified in the description below and in the claims that follow.

The invention is defined by the independent patent claims. The dependent claims define advantageous embodiments of the invention.

In a first aspect, the invention relates more particularly to an apparatus for transferring information acoustically, the apparatus comprising at least one signal generator, at least one energy source, and means for intrusion into a tubular wall. The signal generator is arranged for the acoustic signals to be generated such that the P-waves of the acoustic signals will have a direction that substantially approximates the axial direction of the tubular. The apparatus is arranged for the acoustic signals to be transferred into the tubular by use of the means for intrusion into the tubular wall.

The apparatus comprises a plug comprising fastening means for anchoring into a tubular wall. The plug's fastening means constitutes the apparatus' means for intrusion into a tubular wall. The plug may be a mechanical tubular plug.

The means for intrusion into a tubular wall may be a single metallic tooth or a set of metallic teeth that can be pushed by force into the tubular wall. Any mechanism suitable for the purpose of forcing the means for intrusion into the tubular wall may be applied, such as a jarring mechanism or a hydraulic system.

The means for intrusion into a tubular wall may be arranged such that at least one of the sides of the means for intrusion into a tubular upon intruding into a tubular wall are substantially perpendicular to the axial direction of the tubular at the point of intrusion. The means for intrusion into a tubular wall may be formed such that both an upper and a lower side of the means for intrusion may be perpendicular to the axial direction of a tubular at a point of intrusion. By upper and lower in this context is meant the position of the sides when intruding into a vertical tubular. Arranging the means for intrusion to be perpendicular to the axial direction of the tubular at the point of intrusion will aid in retaining the direction of the P-waves of the acoustic signals upon transferring the signals from the apparatus into the tubular.

Directing the signals' P-waves in the axial direction of the tubular is significantly more efficient than if the P-waves were angled relative to the axial direction, as the signal will travel a shorter distance to reach a receiver a certain distance along the tubular away, and less or no reflections will be needed to reach the receiver. A shorter path with fewer reflections along the way means that the minimum energy cost of producing a signal that will be readable by a receiver a certain distance away from the signal generator producing the signal will be lower.

Any combination of means and method suitable for anchoring the apparatus to a tubular known to a person skilled in the art may be used for the purpose. As these combinations of means and methods for anchoring the apparatus to a tubular are known, they will not be discussed in detail in this text, nor explained or shown in detail in the embodiment descriptions.

The apparatus may further comprise at least one signal receiver, for receiving acoustic signals. The signal receiver may be an accelerometer. By comprising a signal receiver, the apparatus may have increased functionality, such that it may be remotely controlled, and that it may be used to relay information from an external source to an external receiver. The apparatus comprising a receiver, placed in a first position in a borehole, may receive and relay information from a second, similar apparatus placed in a second position in the borehole, to a third, similar apparatus, or to another receiver, placed in a third position.

Furthermore, the apparatus comprising a signal generator may communicate with a signal receiver located outside the bore. The apparatus comprising a signal receiver may receive signals from a signal generator located outside the bore. The signal generator and/or signal receiver located outside the bore may typically be located on a wellhead or production tree. A preferred location for the signal generator and/or signal receiver located outside the bore would be at the cap surrounding a tubular end or any geometry protruding from the wellhead or production tree at a right angle relative to the axial direction of the tubular through which acoustic signals would be transferred.

The apparatus may further comprise at least one sensor and/or transmitter and/or transducer. The at least one sensor and/or transmitter and/or transducer may gather information about the conditions in a borehole where the apparatus may be placed. The at least one sensor and/or transmitter and/or transducer may be a pressure transmitter, a temperature sensor, a conductivity transducer, or other instruments that may gather information about fluid characteristics or other relevant data from the borehole.

The at least one sensor may be placed below the plug of the apparatus, for monitoring a defined volume in a borehole below the plug. The term "defined volume" in this context refers to a closed chamber in the borehole, e.g. defined circumferentially by a casing, upwardly by the plug of the apparatus and downwardly by another plug. By use of the at least one sensor, the apparatus can detect influx of fluid into the volume from other, adjacent volumes, such as from a formation or from another borehole volume separated from the volume by use of a plug or other means. Typically, the influx detected may be an influx of gas, but it may also be water, any liquid state hydrocarbons, or any other fluid. The at least one sensor may comprise any kind of sensor suitable for the purpose, such as a pressure sensor, a density sensor or a viscosity sensor. Data from detection of fluid influx may be used to extrapolate a model for influx rate.

The apparatus may further comprise at least one logic solver for processing data. The at least one logic solver may be used to process data, such as handling data gathered from sensors, transducers and/or transmitters, translating said data into signals more adapted for transferring by acoustic means, or handling data received from an external source.

The apparatus may further comprise a physical barrier, separating a first section and a second section of the apparatus. The barrier may separate a defined volume in a borehole from a non-defined volume in a borehole. The apparatus may further comprise at least two sets of instruments, at least one set of instruments placed in each section of the apparatus, a first set of instruments arranged to measure borehole conditions in the non-defined volume in the borehole and a second set of instruments arranged to measure borehole conditions in the defined volume in the borehole. Each set of instruments may comprise a sensor and/or transmitter and/or transducer, a signal generator, a logic solver, a receiver for receiving acoustic signals, and an energy source.

The apparatus comprising a physical barrier with at least two sets of instruments and at least one set of instruments placed on each side of the physical barrier may allow for comparing the conditions in the non-defined volume of the borehole to those of the defined volume.

The physical barrier may be adapted to satisfy industry requirements and/or national and international standards for the apparatus to act as a primary or secondary well barrier.

Furthermore, the apparatus may comprise a boundary fluid reservoir. The apparatus may be adapted to be placed in a defined volume in a borehole, and to release a boundary fluid into said defined volume. The boundary fluid reservoir may be an integrated part of the apparatus to be placed in the borehole, or it may be remotely placed comprising means for transferring boundary fluid from the remotely placed boundary fluid reservoir to the defined volume. Said means for transferring boundary fluid from the remotely placed boundary fluid reservoir to the defined volume may be a tube.

The defined volume in a borehole will typically be a region between two plugs and a tubular wall of the borehole, and will comprise one or more borehole fluids.

The apparatus may comprise one or more openings through which to release boundary fluid. The apparatus may further comprise one or more further openings, through which borehole fluids may flow into the apparatus to refill the boundary fluid reservoir as boundary fluid is released into the defined volume of the borehole.

The apparatus may further comprise at least one valve, such as a piston valve, for closing or opening for fluid flow through the openings in the apparatus.

Furthermore, the apparatus may comprise a piston that aids in forcing boundary fluid from the boundary fluid reservoir to the defined volume. The same piston may also aid in the intake of borehole fluid into the boundary fluid reservoir. The apparatus may comprise other systems for transferring fluid from the boundary fluid reservoir to the defined volume of the borehole, such as a pump-based system or a bladder-type reservoir.

The boundary fluid may be designed and/or chosen based on specific gravity. Its specific gravity may preferably be different from that of present and/or potentially present borehole fluids in the defined volume. Potentially present boreholes fluids are fluids that may occur in a borehole naturally, such as reservoir fluids from the formations surrounding the borehole, or it may be fluids that may occur in the borehole as a consequence of human activities, such as fluids that are injected directly into the well or into surrounding formations. The boundary fluid is not to be seen as a fluid covered by the term potentially occurring borehole fluid.

Furthermore, the boundary fluid may preferably be a liquid that is immiscible, or partially miscible, with liquids present and/or potentially present in the defined volume of the borehole. Two liquids are defined as partially miscible if, when two volumes of the partially miscible liquids are shaken together, a meniscus will be visible between two layers of resulting liquid, and the two layers' volumes differ from that of the two volumes originally added. Immiscible liquids will, if shaken together, result in two layers of liquid, separated by a meniscus, wherein the two volumes of the two layers are identical to the two volumes of liquids shaken.

In a volume comprising different immiscible fluids, gravitational forces will organize them by their specific gravity, with the lightest fluid in the volume's upper portion and the heaviest fluid in the volume's lowest portion. As partially miscible fluids will also form layers, the same organization will apply to partially miscible fluids too. This principle may be taken advantage of by the invention.

By introducing a boundary fluid with a specific gravity different from that of present and/or possibly occurring borehole fluids in the defined volume, gravitational forces will ensure that the boundary fluid at any time is arranged according to how its specific gravity compares to that of the other fluids present.

In a possible embodiment of the invention, the at least one sensor, transducer and/or transmitter may comprise a plurality of means of detecting fluid characteristics, wherein the means of detecting fluid characteristics may be placed in such a way as to arrange for monitoring fluids in an upper portion of the defined borehole volume. In this embodiment, a boundary fluid will be chosen that has a specific gravity lower than that of any present or potentially present borehole liquid, and higher than that of any present or potentially present borehole gas. Thus, if there is one borehole liquid and one borehole gas present in the defined volume, and the boundary fluid is added, gravitational forces will ensure that the borehole gas sits atop the boundary fluid, which in turn sits atop the borehole liquid.

In a typical case where the apparatus is used, it is not known whether there is gas in the defined borehole volume, neither is it known whether there is a leak e.g. in a plug defining said volume's upper border. By using the apparatus, arranged with the means for detecting fluid characteristics covering an upper portion of said volume, it will be possible to determine if there is a gas present and if there is a leakage in the plug.

If no gas is present, and there is no leak in the plug, the fluid characteristics detected will be consistent with those of the boundary fluid.

If a gas is present and there is no leak in the plug, the boundary fluid will be displaced downwards, and the fluid characteristics of the gas will be detected.

If there is a leak in the plug, the boundary fluid will move upwards, out of the defined volume, and the fluid characteristics detected will be those of a heavier borehole liquid.

The boundary fluid may be miscible with present and/or potentially present borehole fluids. If fluid characteristics data is gathered from the fluids present in a defined volume in a well, it is possible to calculate how the characteristics should change by introducing a miscible boundary fluid with known characteristics into the defined volume. By measuring how characteristics actually does change over time after release of a miscible borehole fluid with known characteristics into a defined volume containing one or more fluids with known characteristics, and compare the measured data with calculated expectations, it will be possible to make deductions regarding the conditions in the defined volume, such as if there is a leak or if there is gas present in the defined volume.

In a second aspect, the invention relates to a method for transferring data from a borehole by means of the apparatus according to the first aspect of the invention, wherein the method comprises transferring information acoustically by use of a tubular, wherein signals are produced by the signal generator and transferred to the tubular via the means for intrusion into a tubular wall.

The method may comprise anchoring the apparatus to a tubular wall.

The method may further comprise producing acoustic signals such that the direction of their P-waves substantially approximates the axial direction of a tubular in which the apparatus is set. Furthermore, the method may comprise transferring acoustic signals via the means for intrusion into a tubular wall in such a way that the direction of the P-waves relative to the axial direction of the tubular is retained.

The method may further comprise gathering information about conditions in a borehole by use of one or more sensors, transmitter and/or transducers, and it may comprise releasing a boundary fluid into a defined volume in a borehole.

The method may further comprise receiving acoustic information from a source.

BRIEF DESCRIPTION OF THE DRAWINGS

In the following is described examples of preferred embodiments illustrated in the accompanying drawings, wherein.

DETAILED DESCRIPTION OF THE DRAWINGS

Figure 1:
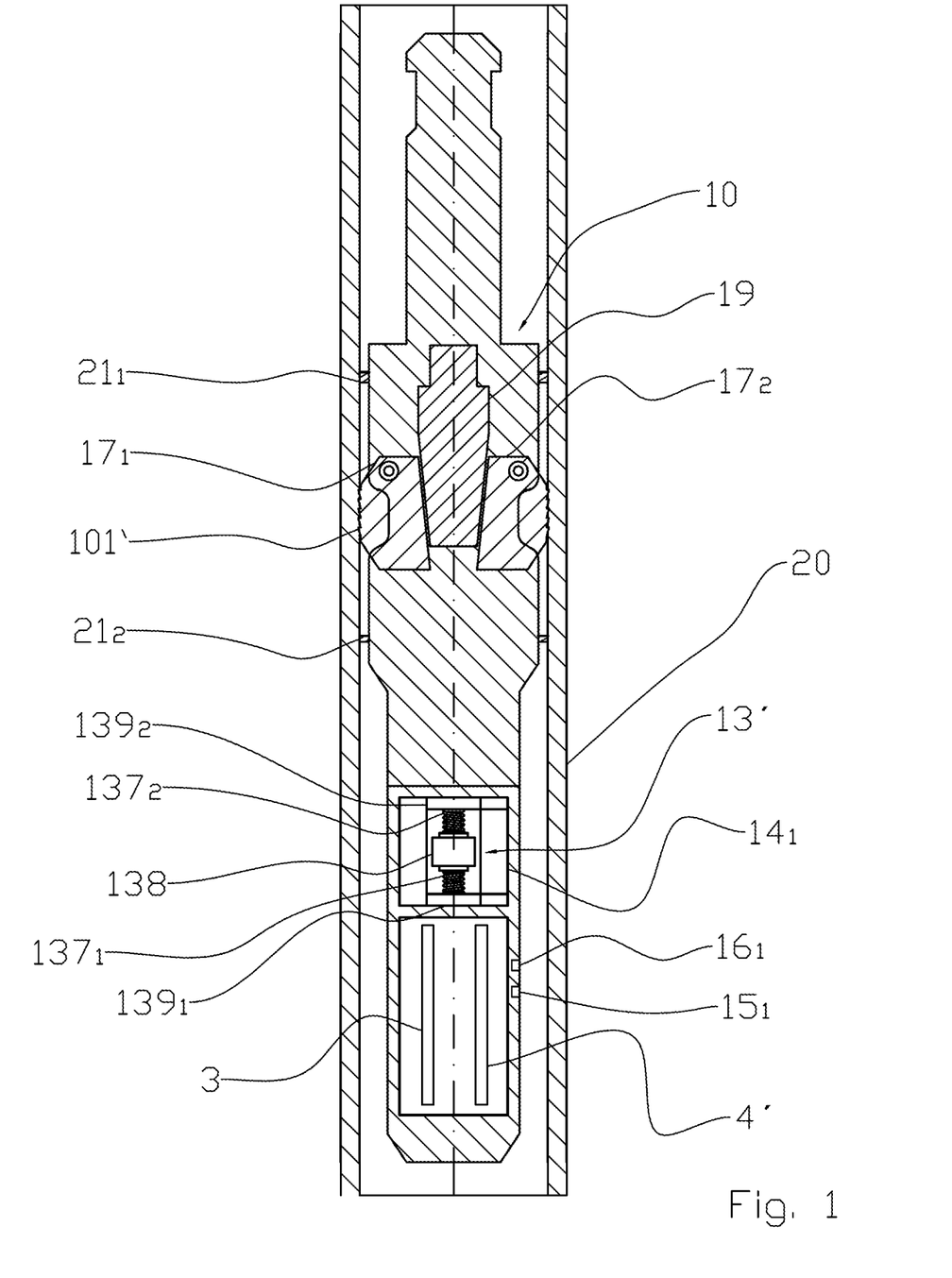
FIG. 1 shows the apparatus for transferring information acoustically anchored to a tubular.

FIG. 1 illustrates the apparatus 1', comprising a plug 10, anchored to a tubular wall by use of means for intrusion into a tubular wall 101'. The apparatus 1 comprises a signal generator 13', the signal generator comprising two anvils $139_1$, $139_2$, two bolts $137_1$ and $137_2$ and a coil 138. The apparatus further comprises a signal receiver $14_1$, a temperature transmitter $16_1$ and a pressure transmitter $15_1$. Furthermore, the apparatus comprises a battery 4' and a logic solver 3. The plug 10 comprises two locking dogs $17_1$ and $17_2$, each locking dog $17_1$ and $17_2$ comprising a set of teeth, the set of teeth constituting the apparatus' 1' means for intrusion into a tubular wall 101'. The plug 10 further comprises a locking bolt 19, an upper pressure seal $21_1$ and a lower pressure seal $21_2$.

By use of the temperature transmitter $15_1$ and the pressure transmitter $16_1$, the apparatus 1' can obtain information about conditions in the volume between the apparatus 1' and the tubular wall. The information may be processed by the logic solver 3. The processed information may then be sent as acoustic signals along the tubular wall to a remote receiver. The apparatus 1' is arranged such that the signal generator 13' may produce acoustic signals with a P-wave direction substantially approximating the axial direction of the tubular 20 at the point where the means for intrusion into a tubular wall 101' intrudes into the tubular wall.

Figure 2:
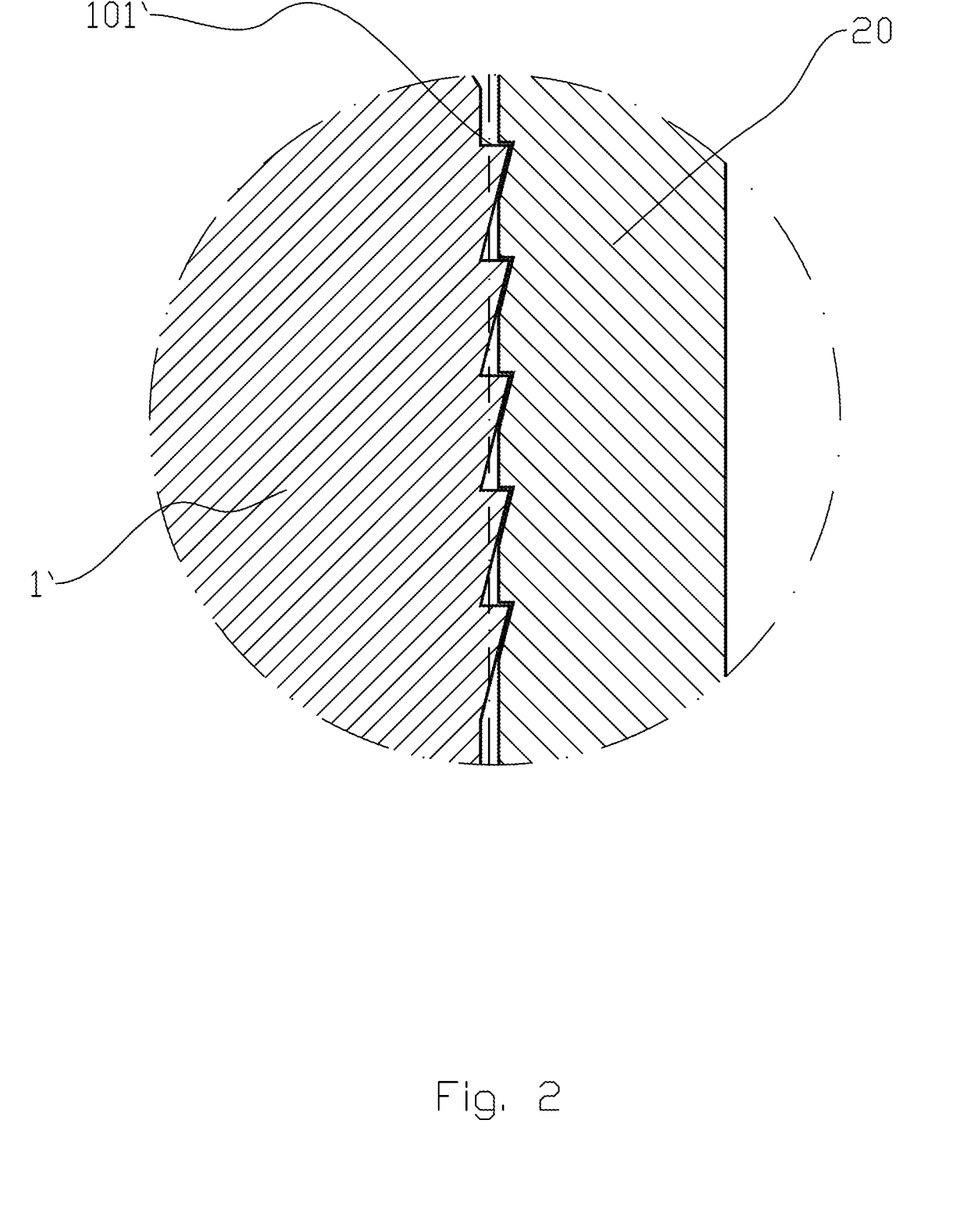
FIG. 2 shows an enhanced view of the means for intrusion into a tubular wall intruding into a tubular wall.

FIG. 2 shows the means for intrusion into a tubular wall 101', as comprised by the apparatus 1', intruding into a tubular wall. The upper sides of the means for intrusion into a tubular wall 101' are arranged such that they are perpendicular to the axial direction of the tubular 20 upon intrusion. The purpose of the perpendicular intrusion is to ensure a signal transfer into the tubular wall that retains the direction of the P-waves; that the P-waves of the acoustic signals retains a direction substantially approximating the axial direction of the tubular 20.

Figure 3:
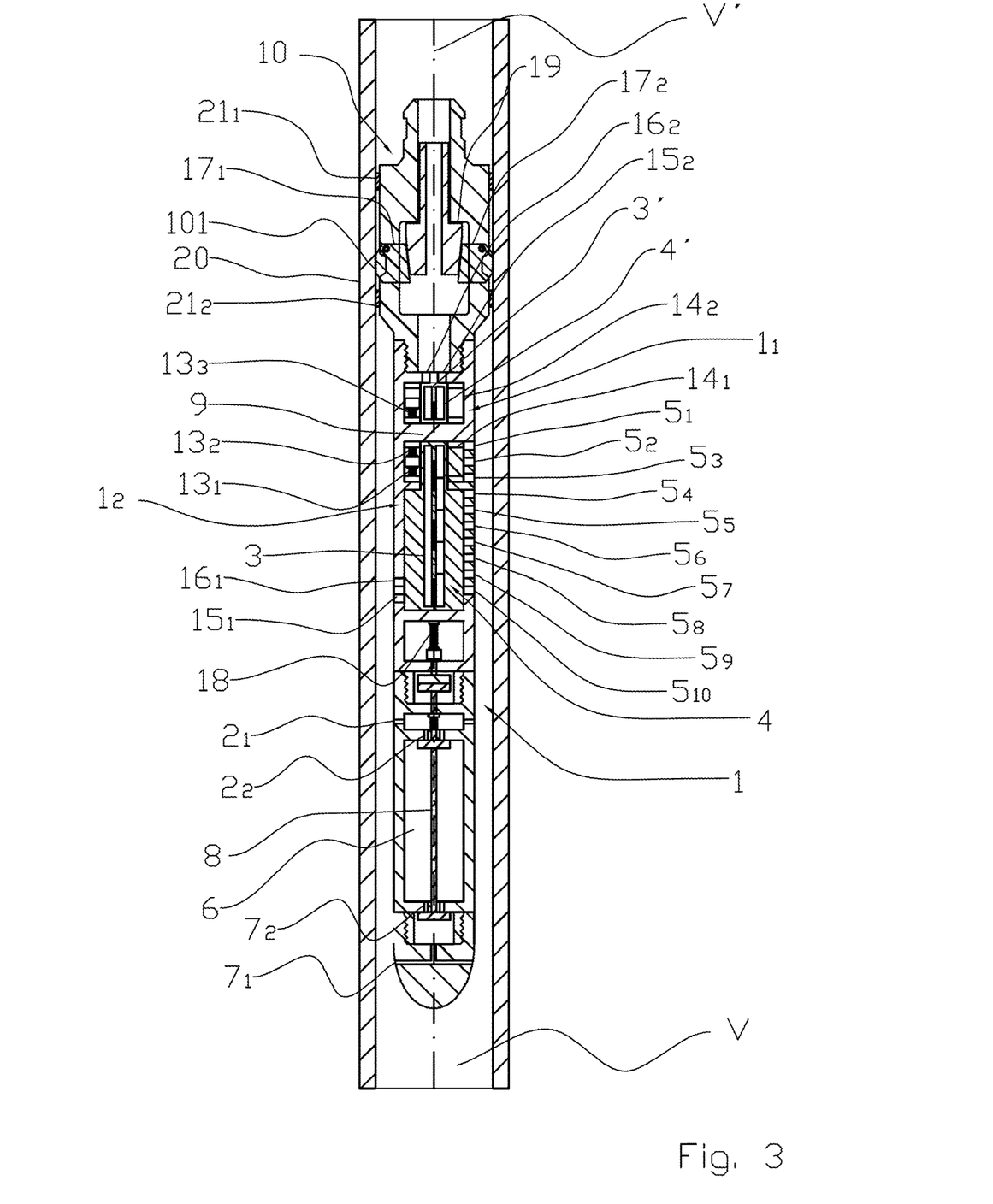
FIG. 3 shows the apparatus for transferring information acoustically in an embodiment comprising a plug, a barrier separating a first section of the apparatus from a second section and separating a non-defined volume in a borehole from a defined volume in the borehole, a boundary fluid reservoir and means for monitoring conditions both in the defined volume and in the non-defined volume.

FIG. 3 shows the apparatus 1 anchored to a tubular 20. The apparatus 1 comprises means for intrusion into a tubular wall 101 intruding into the tubular 20. The means for intrusion into a tubular wall 101 works as the apparatus' 1 anchoring mechanism. The apparatus 1 further comprises a signal generator $13_1$, comprising a coil 137, two coils $137_1$, $137_2$, and two anvils $139_1$, $139_2$. The apparatus 1 further comprises a receiver.

FIG. 3 shows the apparatus 1 for transferring information acoustically, comprising a plug 10, a barrier 9, and means for monitoring conditions ($13_1$-$13_3$, $15_1$, $15_2$, $16_1$, $16_2$) placed in a defined volume V in a borehole. The defined volume V is limited on one end by the plug 10, on the opposite end by other means not shown in the illustration, e.g. the bottom end of the borehole, and radially by a tubular 20.

The plug 10 comprises a locking bolt 19, an upper pressure seal $21_1$, a lower pressure seal $21_2$, and two locking dogs $17_1$ and $17_2$. Each locking dog comprises a set of teeth, constituting the apparatus' 1 means for intrusion into a tubular wall 101. The set of teeth intrudes into the tubular wall, where they acts as means for transferring acoustic signals from the apparatus 1 into the tubular 20, and from the tubular 20 to the apparatus 1.

The apparatus comprises a plurality of signal generators $13_1$-$13_3$ for producing acoustic signals. The signal generators $13_1$-$13_3$ are arranged to produce signals such that the P-waves have a direction that substantially approximates the axial direction of the tubular 20. The apparatus 1, the plug 10 and the plug's teeth, the means for intrusion into a tubular wall 101, are arranged to transfer the acoustic signals efficiently from the signal generators $13_1$-$13_3$ into the tubular.

The apparatus 1 comprises a physical, barrier element 9. The element 9 separates a first section $1_1$ from a second section $1_2$ of the apparatus 1, and a non-defined volume V' in the borehole from the defined volume V.

The first section $1_1$ of the apparatus 1 comprises a battery 4', for providing power to any parts on the first section $1_1$ of the apparatus 1 requiring energy. The first section $1_1$ further comprises a logic solver 3', for processing data, a receiver $14_2$, for receiving acoustic data, the signal generator $13_3$, for generating acoustic signals, a temperature transmitter $16_2$, for monitoring temperature in the non-defined volume V', and a pressure transmitter $15_2$, for monitoring pressure in the non-defined volume V'.

In the second section $1_2$ of the apparatus 1, the apparatus further comprises a boundary fluid reservoir 6, and an actuator 18 that controls a piston valve 8. Furthermore, the second section $1_2$ comprises holes $2_1$, $2_2$, $7_1$ and $7_2$. If the piston valve is open, the holes $2_2$ and $7_2$ will be open, which will allow for fluid to flow into and out from the boundary fluid reservoir 6. In a typical situation, where an immiscible boundary fluid has a lower specific gravity than the borehole fluid present in the borehole surrounding the apparatus 1, and the piston valve is open, gravitational forces will make the heavier borehole fluid flow into the boundary fluid reservoir 6 through holes $7_1$ and $7_2$, and displace the lighter boundary fluid from the boundary fluid reservoir 6 into the borehole through holes $2_2$ and $2_1$.

The apparatus' 1 second section $1_2$ further comprises a range of sensors $5_1$-$5_{10}$, arranged to monitor fluid characteristics in a portion of the defined volume V, and a battery pack 4, comprising five batteries, to provide energy to the sensors $5_1$-$5_{10}$ and any other parts on the second section $1_2$ of the apparatus 1 that requires energy.

Furthermore, the second section $1_2$ of the apparatus 1 comprises a temperature transmitter $16_1$, for monitoring temperature in the defined volume, and a pressure transmitter $15_1$, for monitoring pressure in the defined volume. The second section $1_2$ of the apparatus 1 further comprises a logic solver 3, for processing data.

The second section $1_2$ of the apparatus 1 further comprises signal generators $13_1$-$13_2$ for generating acoustic signals, and receiver $14_1$ for receiving acoustic data. By use of one or more the signal generators $13_1$-$13_2$ and the receiver $14_1$, and the signal generator $13_3$ and the receiver $14_2$, the two sections of the apparatus 1 can communicate with each other. The signal generators $13_1$-$13_3$ and the receivers $14_1$-$14_2$ further facilitates for communication to and/or from the apparatus 1 to and/or from other sources.

Figure 4:
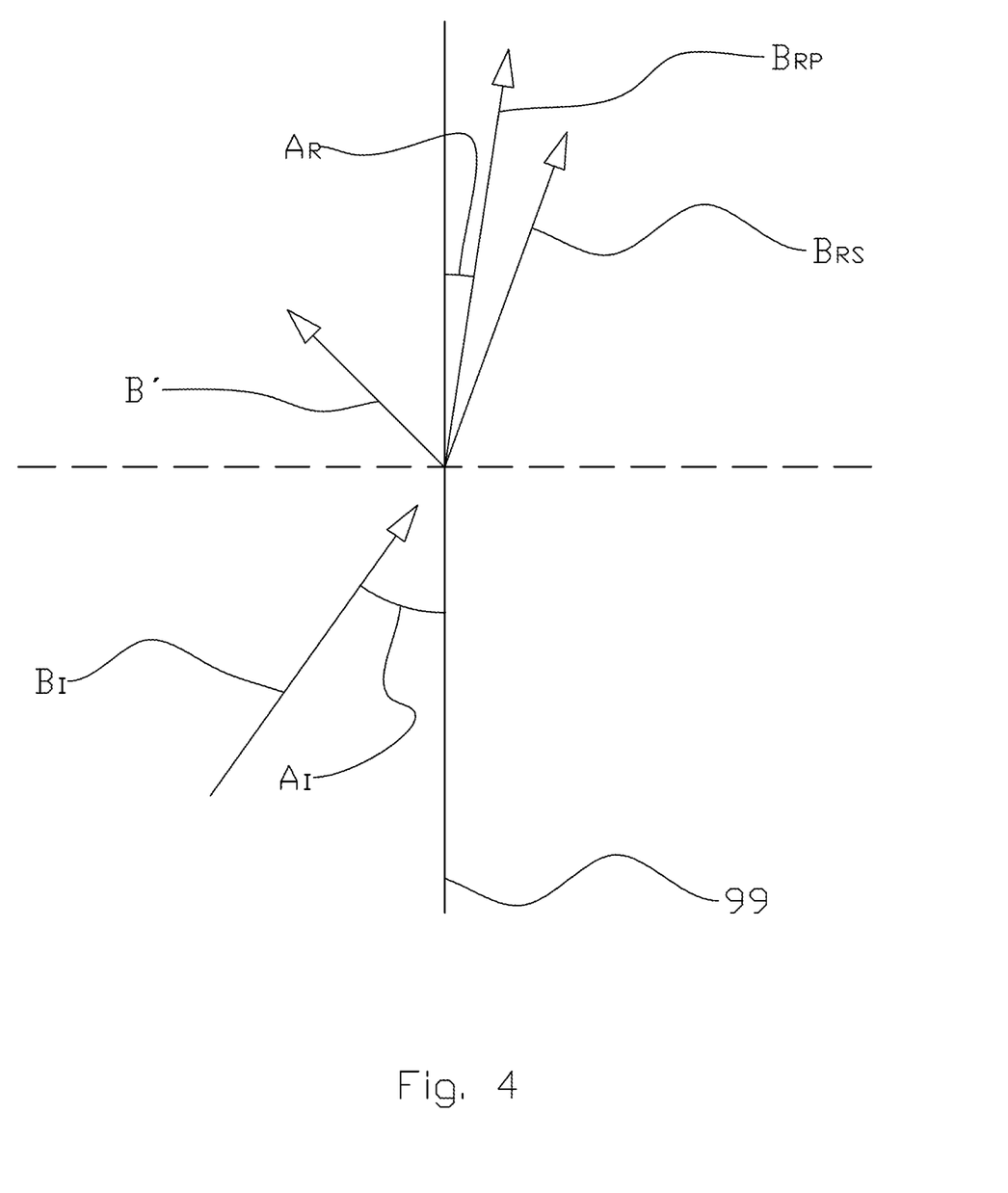
FIG. 4 shows a schematic illustrating how the angle of an incoming acoustic signal into a material affects the reflection and refraction of the signal from and into the material.

FIG. 4 illustrates how an acoustic signal may propagate in a material. Arrow $B_I$ represents an incident beam, an acoustic signal directed towards a left border 99 of a tubular wall. Angle $A_I$ is the angle of the incident beam $B_I$ relative to the left border 99 of the tubular wall. B' represents a reflected signal, $B_{RP}$ a refracted P-wave, $B_{RS}$ a refracted S-wave, and $A_R$ an angle of the refracted P-wave of the acoustic signal. By reducing the incident beam angle $A_I$, the angle of the refracted P-wave $A_R$ will be reduced. Reduction of the angle of the refracted P-wave $A_R$ will allow for a more energy efficient route of transport for the acoustic signal.

By having means for intrusion into a tubular wall 101' through which acoustic signal is transferred into a tubular 20 that are arranged with an upper side approximately perpendicular to the axial direction of the tubular, the acoustic signals may have an incident angle $A_I$ of approximately 0°, and thus a refracted P-wave angle $A_R$ of approximately 0°.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. It should also be noted that the various features in the figures are not necessarily drawn to scale.

The mere fact that certain measures are recited in mutually different dependent claims does not indicate that a combination of these measures cannot be used to advantage.

The invention claimed is:

1. An apparatus for transferring information acoustically via a tubular, the apparatus comprising:
   at least one signal generator;
   at least one energy source; and
   means for intrusion into a tubular wall at a desired location;
   wherein the at least one signal generator is arranged to generate signals with a P-wave direction in an axial direction of the tubular at the desired location;
   wherein the means for intrusion is adapted for transferring acoustic signals from the apparatus into the tubular; and
   wherein the apparatus further comprises a mechanical plug, the mechanical plug being configured to be anchored into the tubular wall via the means for intrusion.

2. The apparatus according to claim 1, the means for intrusion into the tubular wall are arranged such that at least one of sides of the means for intrusion into the tubular wall upon intruding into the tubular wall are perpendicular to the axial direction of the tubular where the apparatus intrudes into the tubular wall.

3. The apparatus according to claim 1, wherein the mechanical plug is a barrier plug.

4. The apparatus according to claim 1, wherein the apparatus comprises at least one of a sensor, transducer and transmitter for measuring conditions in a well.

5. The apparatus according to claim 1, wherein the apparatus comprises at least one signal receiver, for receiving the acoustic signals.

6. The apparatus according to claim 1, wherein the apparatus comprises at least one logic solver processor, for processing data.

7. The apparatus according to claim 1, wherein the apparatus comprises at least two sets of instruments, each set comprising at least one of the at least one signal generator, at least of a one sensor, a transmitter or a transducer, at least one of the at least one energy source, at least one logic solver processor, and at least one receiver, wherein at least one set of the at least two sets of the instruments is positioned on each side of a physical barrier for measuring conditions on each side of the barrier and communicating through the barrier.

8. The apparatus according to claim 1, comprising a reservoir for storing a boundary fluid.

9. The apparatus according to claim 8, wherein the apparatus to release the boundary fluid into a defined volume in a borehole in which the apparatus is placed.

10. The apparatus according to claim 1, comprising a plurality of at least one of sensors, transducers and transmitters arranged for monitoring fluid characteristics in a portion of a defined volume in a borehole.

11. A method for transferring information acoustically via a tubular via an apparatus, the method comprising:
  establishing an intrusion into a tubular wall of the tubular by use of a means for intrusion at a desired location;
  generating acoustic signals by use of at least one signal generator; and
  transferring the acoustic signals generated from the at least one signal generator into the tubular wall via the means for intrusion;
  wherein the acoustic signals are transferred into the tubular wall in a P-wave direction that in an axial direction of the tubular at the desired location; and
  wherein the apparatus further comprises a mechanical plug, the mechanical plug being configured to be anchored into the tubular wall via the means for intrusion.

* * * * *